United States Patent
Morikawa et al.

(10) Patent No.: US 10,220,368 B2
(45) Date of Patent: Mar. 5, 2019

(54) OXYGEN STORAGE MATERIAL AND METHOD OF PRODUCING THE SAME

(71) Applicant: TOYOTA JIDOSHA KABUSHIKI KAISHA, Toyota-shi, Aichi (JP)

(72) Inventors: Akira Morikawa, Nagakute (JP); Yoshihiro Goto, Nagakute (JP); Toshitaka Tanabe, Nagakute (JP); Masahide Miura, Toyota (JP); Hiromasa Suzuki, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 15/462,984

(22) Filed: Mar. 20, 2017

(65) Prior Publication Data

US 2017/0274347 A1    Sep. 28, 2017

(30) Foreign Application Priority Data

Mar. 24, 2016   (JP) .................................. 2016-060675

(51) Int. Cl.
  *B01J 20/06*   (2006.01)
  *B01J 20/30*   (2006.01)
(52) U.S. Cl.
  CPC .......... *B01J 20/06* (2013.01); *B01J 20/3085* (2013.01)

(58) Field of Classification Search
  CPC .............................. B01J 20/06; B01J 20/3085
  See application file for complete search history.

(56) References Cited

U.S. PATENT DOCUMENTS

2013/0029840 A1*   1/2013   Morikawa ................ B01J 35/04
                                                      502/304
2015/0273437 A1*   10/2015  Miura ...................... B01J 37/03
                                                      502/303

FOREIGN PATENT DOCUMENTS

| JP | 2003277059 A  | 10/2003 |
| JP | 2005-231951 A | 9/2005  |
| JP | 2009084061 A  | 4/2009  |
| JP | 2011219329 A  | 11/2011 |
| JP | 2014-114180 A | 6/2014  |

* cited by examiner

*Primary Examiner* — Melvin C. Mayes
*Assistant Examiner* — Michael Forrest
(74) *Attorney, Agent, or Firm* — Sughrue Mion, PLLC

(57) ABSTRACT

An oxygen storage material comprises three pyrochlore-type composite oxides which are a ceria-zirconia composite oxide, a lanthana-zirconia composite oxide, and a ceria-zirconia-lanthana composite oxide, and which coexist together, wherein the oxygen storage material contains:
  first secondary particles made of the pyrochlore-type ceria-zirconia composite oxide and the pyrochlore-type ceria-zirconia-lanthana composite oxide; and
  second secondary particles made of the pyrochlore-type lanthana-zirconia composite oxide and the pyrochlore-type ceria-zirconia-lanthana composite oxide.

10 Claims, 6 Drawing Sheets

OXYGEN STORAGE MATERIAL AND METHOD OF PRODUCING THE SAME

BACKGROUND OF THE INVENTION

Field of the Invention

The present invention relates to an oxygen storage material comprising composite oxides and a method for producing the same.

Related Background Art

Composite oxides containing various metal oxides have heretofore been utilized as supports, promoters, and the like for catalysts for purification of exhaust gas. As the metal oxide in such a composite oxide, ceria has been preferably used because ceria is capable of storing and releasing oxygen according to the partial pressure of oxygen in an atmosphere (i.e. having an oxygen storing capacity). In addition, various kinds of composite materials containing ceria have recently been studied.

For example, Japanese Unexamined Patent Application Publication No. 2005-231951 (Patent Literature 1) discloses a composite oxide having a pyrochlore structure containing Ce and Zr, wherein 40 to 90% of Ce is substituted by ions of a rare earth metal other than Ce or ions of an alkaline earth metal. Patent Literature 1 also states that this composite oxide is excellent in oxygen storage/release performance. However, since the composite oxide comprises one kind of a pyrochlore-type composite oxide, the composite oxide does not have a sufficiently high oxygen storage/release rate.

Meanwhile, Japanese Unexamined Patent Application Publication No. 2014-114180 (Patent Literature 2) discloses a composite oxide material comprising: crystal particles having a pyrochlore structure of a ceria-zirconia composite oxide; and a crystal having a pyrochlore structure of a lanthana-zirconia composite oxide present on surfaces of the particles, wherein the crystal of the lanthana-zirconia composite oxide is at least partially solid-dissolved in the surfaces of the crystal particles of the ceria-zirconia composite oxide. Patent Literature 2 also states that this composite oxide material is excellent in stability at high temperature.

SUMMARY OF THE INVENTION

The present invention has been made in view of the above-described problems of the conventional technologies, and an object of the present invention is to provide an oxygen storage material having a high oxygen storage/release rate even after exposed to high temperature, and a method for producing the same.

The present inventors have conducted intensive study to achieve the above-described object, and consequently found the following fact. Specifically, by performing a reduction treatment at a specific temperature on a raw material mixture containing a pyrochlore-type ceria-zirconia composite oxide and a lanthana-zirconia composite oxide in a specific ratio, it is possible to obtain a composite oxide comprising three pyrochlore-type composite oxides which are a ceria-zirconia composite oxide, a lanthana-zirconia composite oxide, and a ceria-zirconia-lanthana composite oxide, and which coexist together, wherein the composite oxide contains two kinds of secondary particles including at least the ceria-zirconia-lanthana composite oxide. This composite oxide thus obtained has a high oxygen storage/release rate even after exposed to high temperature. This finding has led to the completion of the present invention.

Specifically, the oxygen storage material of the present invention is an oxygen storage material comprising three pyrochlore-type composite oxides which are a ceria-zirconia composite oxide, a lanthana-zirconia composite oxide, and a ceria-zirconia-lanthana composite oxide, and which coexist together, wherein the oxygen storage material contains: first secondary particles made of the pyrochlore-type ceria-zirconia composite oxide and the pyrochlore-type ceria-zirconia-lanthana composite oxide; and second secondary particles made of the pyrochlore-type lanthana-zirconia composite oxide and the pyrochlore-type ceria-zirconia-lanthana composite oxide.

In the entire oxygen storage material as described above, a content of cerium relative to a total content of cerium and lanthanum in the pyrochlore-type ceria-zirconia-lanthana composite oxide is preferably 0.30 to 0.90, and more preferably 0.50 to 0.90, in an atomic ratio [Ce/(Ce+La)].

Furthermore, in the entire oxygen storage material as described above, a content of cerium relative to a total amount of cerium and zirconium in the pyrochlore-type ceria-zirconia composite oxide is preferably 0.40 to 0.70 in an atomic ratio [Ce/(Ce+Zr)], and a content of lanthanum relative to a total amount of lanthanum and zirconium in the pyrochlore-type lanthana-zirconia composite oxide is preferably 0.40 to 0.60 in an atomic ratio [La/(La+Zr)].

Moreover, in the oxygen storage material of the present invention, a content ratio of the pyrochlore-type ceria-zirconia composite oxide is preferably 30 to 80% by mass, a content ratio of the pyrochlore-type lanthana-zirconia composite oxide is preferably 10 to 40% by mass, and a content ratio of the pyrochlore-type ceria-zirconia-lanthana composite oxide is preferably 10 to 60% by mass, relative to a total amount of the pyrochlore-type ceria-zirconia composite oxide, the pyrochlore-type lanthana-zirconia composite oxide, and the pyrochlore-type ceria-zirconia-lanthana composite oxide.

Meanwhile, a method for producing an oxygen storage material of the present invention comprises: performing a reduction treatment at a temperature of 1200 to 1600° C. on a raw material mixture containing a pyrochlore-type ceria-zirconia composite oxide and a lanthana-zirconia composite oxide in a mass ratio of 1:8 to 8:1, thereby obtaining an oxygen storage material including three pyrochlore-type oxides which are a ceria-zirconia composite oxide, a lanthana-zirconia composite oxide, and a ceria-zirconia-lanthana composite oxide, and which coexist together.

In the method for producing an oxygen storage material as described above, the lanthana-zirconia composite oxide in the raw material mixture preferably has no pyrochlore structure.

Moreover, in the method for producing an oxygen storage material of the present invention, in the raw material mixture, a content of cerium relative to a total amount of cerium and zirconium in the pyrochlore-type ceria-zirconia composite oxide is preferably 0.40 to 0.90 in an atomic ratio [Ce/(Ce+Zr)], and a content of lanthanum relative to a total amount of lanthanum and zirconium in the lanthana-zirconia composite oxide is preferably 0.40 to 0.60 in an atomic ratio [La/(La+Zr)].

Note that although it is not necessarily clear why the oxygen storage material of the present invention has a high oxygen storage/release rate even after exposed to high temperature, the present inventors have speculated as follows. Specifically, the oxygen storage material of the present invention comprises three pyrochlore-type composite oxides which are the ceria-zirconia composite oxide, the lanthana-zirconia composite oxide, and the ceria-zirconia-lanthana composite oxide, and which coexist together. The pyrochlore-type ceria-zirconia composite oxide ($Ce_2Zr_2O_7$) (hereinafter, abbreviated as the "pyrochlore-type CZ") phase-transitions to and from the K structure ($Ce_2Zr_2O_8$) in accordance with the partial pressure of oxygen in the gas phase to thus exhibit a high efficiency of use of Ce close to the theoretical limitation. However, since the pyrochlore-type CZ is a metastable phase, when exposed to high temperature, the superlattice structure collapses, so that the efficiency of use of Ce decreases, lowering the oxygen storage/release rate (OSC-r). On the other hand, since the pyrochlore-type lanthana-zirconia composite oxide ($La_2Zr_2O_7$) (hereinafter, abbreviated as the "pyrochlore-type LZ") is a stable phase, the pyrochlore-type LZ is excellent in heat resistance compared with the pyrochlore-type CZ. In the composite oxide including the pyrochlore-type CZ and the pyrochlore-type LZ coexisting together, the components having the same crystal system coexist together, which allows the structures to stabilize each other, so that the heat resistance as the composite oxide is improved. In addition, in the oxygen storage material of the present invention, the pyrochlore-type ceria-zirconia-lanthana composite oxide (hereinafter, abbreviated as the "pyrochlore-type CZL") further coexists. It is speculated that since this pyrochlore-type CZL has a high oxygen storage/release rate (OSC-r) compared with that of the pyrochlore-type CZ, the oxygen storage material of the present invention exhibits a high oxygen storage/release rate (OSC-r) while keeping the efficiency of use of Ce.

According to the present invention, it is possible to obtain an oxygen storage material having a high oxygen storage/release rate even after exposed to high temperature.

DETAILED DESCRIPTION OF THE PREFERRED EMBODIMENTS

Figure 1A:
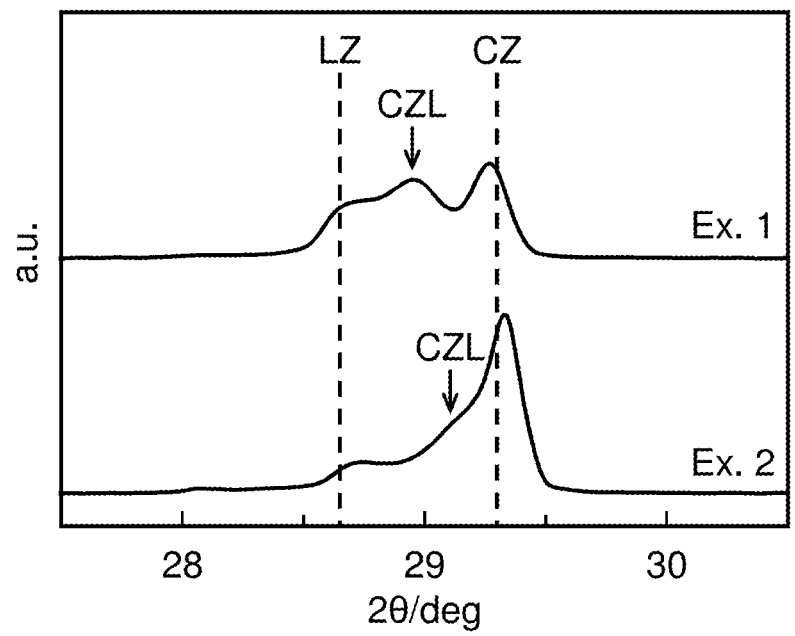
FIG. 1A is a graph showing X-ray diffraction patterns of composite oxide powders obtained in Examples 1 to 2.

Hereinafter, the present invention will be described in detail based on preferred embodiments thereof.

First, an oxygen storage material of the present invention will be described. The oxygen storage material of the present invention is an oxygen storage material comprising three pyrochlore-type composite oxides which are a ceria-zirconia composite oxide, a lanthana-zirconia composite oxide, and a ceria-zirconia-lanthana composite oxide, and which coexist together, wherein the oxygen storage material contains: first secondary particles made of the pyrochlore-type ceria-zirconia composite oxide (the pyrochlore-type CZ) and the pyrochlore-type ceria-zirconia-lanthana composite oxide (the pyrochlore-type CZL); and second secondary particles made of the pyrochlore-type lanthana-zirconia composite oxide (the pyrochlore-type LZ) and the pyrochlore-type ceria-zirconia-lanthana composite oxide (the pyrochlore-type CZL). With this, the oxygen storage material of the present invention exhibits a high heat resistance and a high oxygen storage/release rate. When the oxygen storage material of the present invention having such properties is used as a support or a promoter for a catalyst for purification of exhaust gas, a rapid change in the concentration of oxygen, which frequently occurs in a vehicle and the like, can be handled, and it is thus possible to suppress deterioration of the emission.

The ceria-zirconia composite oxide according to the present invention is one (the pyrochlore-type CZ) having a crystal structure (a pyrochlore structure) in which Ce and Zr are regularly arranged in the pyrochlore type. In addition, the lanthana-zirconia composite oxide according to the present invention is one (the pyrochlore-type LZ) having a crystal structure (a pyrochlore structure) in which La and Zr are regularly arranged in the pyrochlore type. Moreover, the ceria-zirconia-lanthana composite oxide according to the present invention is one (the pyrochlore-type CZL) having a crystal structure (a pyrochlore structure) in which Ce, Zr, and La are regularly arranged into the pyrochlore type.

In the oxygen storage material of the present invention, the content ratio of the pyrochlore-type CZ, which is determined from a peak intensity ratio of an X-ray diffraction pattern, is preferably 30 to 80% by mass, more preferably 30 to 70% by mass, and particularly preferably 40 to 70% by mass, relative to the total content of the pyrochlore-type CZ, the pyrochlore-type LZ, and the pyrochlore-type CZL. If the content ratio of the pyrochlore-type CZ is less than the lower limit, the oxygen storage/release rate tends to decrease, while if the content ratio of the pyrochlore-type CZ is more than the upper limit, the heat resistance tends to decrease.

In addition, the content ratio of the pyrochlore-type LZ, which is determined from a peak intensity ratio of an X-ray diffraction pattern, is preferably 10 to 40% by mass, and more preferably 10 to 30% by mass, relative to the total content of the pyrochlore-type CZ, the pyrochlore-type LZ, and the pyrochlore-type CZL. If the content ratio of the pyrochlore-type LZ is less than the lower limit, the heat resistance tends to decrease, while if the content ratio of the pyrochlore-type LZ is more than the upper limit, the oxygen storage/release rate tends to decrease.

Moreover, the content ratio of the pyrochlore-type CZL, which is determined from a peak intensity ratio of an X-ray diffraction pattern, is preferably 10 to 60% by mass, and more preferably 10 to 40% by mass, relative to the total content of the pyrochlore-type CZ, the pyrochlore-type LZ, and the pyrochlore-type CZL. If the content ratio of the pyrochlore-type CZL is out of the above-described range, the oxygen storage/release rate after exposed to high temperature tends to decrease.

Note that in the present invention, the X-ray diffraction pattern of the oxygen storage material is measured using CuKα as an X-ray source after the oxygen storage material is heated at 1100° C. for 5 hours in the atmosphere.

The content of Ce in the pyrochlore-type CZ in the entire oxygen storage material of the present invention is preferably 0.40 to 0.70, and more preferably 0.40 to 0.60, in an atomic ratio [Ce/(Ce+Zr)] relative to the total amount of Ce and Zr. If the content of Ce is less than the lower limit, the oxygen storage/release rate tends to decrease, while if the content of Ce is more than the upper limit, the efficiency of use of Ce tends to decrease. Note that the content of Ce in the pyrochlore-type CZ in the entire oxygen storage material is calculated as follows. Specifically, a lattice constant of the pyrochlore-type CZ is determined based on a diffraction peak of the pyrochlore-type CZ in an X-ray diffraction pattern of the oxygen storage material, and the content of Ce is calculated from the lattice constant determined from the X-ray diffraction peak, on the premise that the atomic ratio [Ce/(Ce+Zr)] and the lattice constant of the pyrochlore-type CZ follow Vergard's law having $ZrO_2$ and $CeO_2$ at the opposite ends.

The content of La in the pyrochlore-type LZ in the entire oxygen storage material of the present invention is preferably 0.40 to 0.60, and more preferably 0.45 to 0.55, in an atomic ratio [La/(La+Zr)] relative to the total amount of La and Zr. If the content of La is less than the lower limit, the heat resistance tends to decrease, while if the content of La is more than the upper limit, the pyrochlore structure tends to be unlikely to be formed. Note that the content of La in the pyrochlore-type LZ in the entire oxygen storage material is calculated as follows. Specifically, a lattice constant of the pyrochlore-type LZ is determined based on a diffraction peak of the pyrochlore-type LZ in the X-ray diffraction pattern of the oxygen storage material, and the content of La is calculated from the lattice constant determined from the X-ray diffraction peak, on the premise that the atomic ratio [La/(La+Zr)] and the lattice constant of the pyrochlore-type LZ follow Vergard's law having $ZrO_2$ and $La_2O_3$ at the opposite ends.

The content of Ce in the pyrochlore-type CZL in the entire oxygen storage material of the present invention is preferably 0.30 to 0.90, and more preferably 0.50 to 0.90, in an atomic ratio [Ce/(Ce+La)] relative to the total amount of Ce and La. If the content of Ce is less than the lower limit, the oxygen storage/release rate tends to decrease, while if the content of Ce is more than the upper limit, the heat resistance tends to decrease. Note that the content of Ce in the pyrochlore-type CZL in the entire oxygen storage material is calculated as follows. Specifically, a lattice constant of the pyrochlore-type CZL is determined based on a diffraction peak of the pyrochlore-type CZL in the X-ray diffraction pattern of the oxygen storage material, and the content of Ce is calculated from the lattice constant determined from the X-ray diffraction peak, on the premise that the atomic ratio [Ce/(Ce+La)] and the lattice constant of the pyrochlore-type CZL follow Vergard's law having $La_2Zr_2O_7$ and $Ce_2Zr_2O_8$ at the opposite ends.

In addition, although the content of Zr in the pyrochlore-type CZL in the entire oxygen storage material of the present invention is not particularly limited as long as the function effects achieved by Ce and La are not impaired, the content of Zr is preferably 0.40 to 0.80, and more preferably 0.45 to 0.60, in an atomic ratio [Zr/(Ce+Zr+La)] relative to the total amount of Ce, Zr, and La. If the content of Zr is less than the lower limit, the heat resistance of the structure tends to decrease, while if the content of Zr is more than the upper limit, the oxygen storage/release rate tends to decrease.

The oxygen storage material of the present invention contains: first secondary particles made of the pyrochlore-type CZ and the pyrochlore-type CZL; and second secondary particles made of the pyrochlore-type LZ and the pyrochlore-type CZL.

In such an oxygen storage material of the present invention, the content of the first secondary particles is preferably 40 to 90% by mass, and more preferably 50 to 80% by mass, relative to the entire oxygen storage material. If the content of the first secondary particles is less than the lower limit, the oxygen storage/release rate tends to decrease, while if the content of the first secondary particles is more than the upper limit, the heat resistance tends to decrease.

In addition, the content of the second secondary particles is preferably 10 to 60% by mass, and more preferably 20 to 50% by mass, relative to the entire oxygen storage material. If the content of the second secondary particles is less than the lower limit, the heat resistance tends to decrease, while if the content of the second secondary particles is more than the upper limit, the oxygen storage/release rate tends to decrease.

Note that the contents of the first secondary particles and the second secondary particles are measured by the following method. Specifically, a pyrochlore-type CZ powder in the same atomic ratio (Ce/Zr) as that of the pyrochlore-type CZ contained in the oxygen storage material and a pyrochlore-type LZ powder in the same atomic ratio (La/Zr) as that of the pyrochlore-type LZ contained in the oxygen storage material are prepared. These powders are then mixed with the mixing ratio being changed. An X-ray diffraction pattern of each of the obtained mixtures is measured (X-ray source: CuKα), and an intensity ratio between two diffraction lines near $2\theta=29°$ in the obtained X-ray diffraction pattern is determined. This intensity ratio of the diffraction lines is plotted with respect to the mixing ratio between the pyrochlore-type CZ powder and the pyrochlore-type LZ powder to prepare a calibration curve regarding the mixing ratio and the intensity ratio of the diffraction lines. Next, an intensity ratio between two diffraction lines near $2\theta=29°$ in the X-ray diffraction pattern of the oxygen storage material is determined, and a content ratio between the pyrochlore-type CZ and the pyrochlore-type LZ in the oxygen storage material is determined based on the calibration curve. In the present invention, since the pyrochlore-type CZL is substantially evenly distributed to the first secondary particles and the second secondary particles, the content ratio between the pyrochlore-type CZ and the pyrochlore-type LZ is the contents of the first secondary particles and the second secondary particles in the oxygen storage material.

In such first secondary particles, the content of the pyrochlore-type CZ is preferably 50 to 90 mol %, and more preferably 70 to 90 mol %. If the content of the pyrochlore-type CZ is less than the lower limit, the oxygen storage/release rate tends to decrease, while if the content of the pyrochlore-type CZ is more than the upper limit, the heat resistance tends to decrease.

In addition, in the second secondary particles, the content of the pyrochlore-type LZ is preferably 20 to 80 mol %, and more preferably 30 to 60 mol %. If the content of the pyrochlore-type LZ is less than the lower limit, the heat resistance tends to decrease, while if the content of the pyrochlore-type LZ is more than the upper limit, the oxygen storage/release rate tends to decrease.

Note that the content of the pyrochlore-type CZ in the first secondary particles and the content of the pyrochlore-type LZ in the second secondary particles are measured by the following method. Specifically, a lattice constant of the pyrochlore-type CZL is determined from an X-ray diffraction pattern of the oxygen storage material, and an atomic ratio of the pyrochlore-type CZL is determined from this lattice constant based on Vergard's law. A pyrochlore-type CZL powder in the same atomic ratio as the atomic ratio thus determined and a pyrochlore-type CZ powder in the same atomic ratio (Ce/Zr) as that of the pyrochlore-type CZ contained in the oxygen storage material are prepared. These powders are mixed with the mixing ratio being changed. An X-ray diffraction pattern of each of the obtained mixtures is measured (X-ray source: CuKα), and an intensity ratio between two diffraction lines near $2\theta=29°$ in the obtained X-ray diffraction pattern is determined. This intensity ratio of the diffraction lines is plotted with respect to the mixing ratio between the pyrochlore-type CZ powder and the pyrochlore-type CZL powder to prepare a calibration curve regarding the mixing ratio and the intensity ratio of the diffraction lines. Next, an intensity ratio between two diffraction lines near $2\theta=29°$ in the X-ray diffraction pattern of the oxygen storage material is determined, and a content ratio between the pyrochlore-type CZ and the pyrochlore-type CZL in the oxygen storage material is determined based on the calibration curve. In the present invention, since the pyrochlore-type CZL is substantially evenly distributed to the first secondary particles and the second secondary particles, the content of the pyrochlore-type CZ in the first secondary particles can be determined from the content ratio between the pyrochlore-type CZ and the pyrochlore-type CZL. In addition, the content of the pyrochlore-type LZ in the second secondary particles can be similarly determined from the content ratio between the pyrochlore-type LZ and the pyrochlore-type CZL in the oxygen storage material.

In the oxygen storage material of the present invention, an average particle diameter of the first secondary particles is preferably 0.5 to 10 μm, and more preferably 1 to 5 μm. If the average particle diameter of the first secondary particles is less than the lower limit, the heat resistance tends to decrease, while if the average particle diameter of the first secondary particles is more than the upper limit, the oxygen storage/release rate tends to decrease.

In addition, an average particle diameter of the second secondary particles is preferably 0.1 to 3 μm, and more preferably 0.2 to 2 μm. If the average particle diameter of the second secondary particles is less than the lower limit, the heat resistance tends to decrease, while if the average particle diameter of the second secondary particles is more than the upper limit, the oxygen storage/release rate tends to decrease.

Note that the average particle diameters of these secondary particles are measured by the following method. Specifically, first, an energy dispersive X-ray (EDX) spectrometry is performed on the oxygen storage material using a scanning electron microscope (SEM). Then, a plurality of the first secondary particles, which are made of the pyrochlore-type CZ and the pyrochlore-type CZL, and a plurality of the second secondary particles, which are made of the pyrochlore-type LZ and the pyrochlore-type CZL are extracted at random (preferably 50 particles or more for each) while associating the obtained SEM image with an EDX elemental mapping. The maximum diameter and the minimum diameter are measured for each of the extracted secondary particles, and an arithmetic mean value of these diameters is determined to be used as the diameter of the secondary particle. This measurement is performed on a plurality of particles in each set of the first secondary particles and the second secondary particles, and the arithmetic mean values thereof are used as the average particle diameter of the first secondary particles and the average particle diameter of the second secondary particles, respectively.

Next, a method for producing an oxygen storage material of the present invention will be described. The method for producing an oxygen storage material of the present invention comprises: performing a reduction treatment at a temperature of 1200 to 1600° C. on a raw material mixture containing a pyrochlore-type ceria-zirconia composite oxide (a pyrochlore-type CZ) and a lanthana-zirconia composite oxide in a mass ratio of 1:8 to 8:1, thereby obtaining an oxygen storage material including three pyrochlore-type oxides which are a ceria-zirconia composite oxide, a lanthana-zirconia composite oxide, and a ceria-zirconia-lanthana composite oxide, and which coexist together.

In the method for producing an oxygen storage material of the present invention, first, a pyrochlore-type CZ and a lanthana-zirconia composite oxide, which are raw materials, are mixed in a mass ratio of 1:8 to 8:1. If the mass ratio between the pyrochlore-type CZ and the lanthana-zirconia composite oxide is out of the above-described range, the pyrochlore-type CZL is not formed, and the oxygen storage/release rate of the obtained oxygen storage material after exposed to high temperature tends to decrease. In addition, from the viewpoint that an oxygen storage material having a higher oxygen storage/release rate after exposed to high temperature can be obtained, the mass ratio between the pyrochlore-type CZ and the lanthana-zirconia composite oxide is preferably 1:8 to 5:1, more preferably 1:8 to 3:1, and particularly preferably 1:1 to 2:1.

The pyrochlore-type CZ used as a raw material in the method for producing an oxygen storage material of the present invention is not particularly limited, and a conventionally known one may be used. In such a pyrochlore-type CZ, the content of Ce is not particularly limited, but is preferably 0.40 to 0.90, and more preferably 0.50 to 0.80, in an atomic ratio [Ce/(Ce+Zr)] relative to the total amount of Ce and Zr. If the content of Ce is less than the lower limit, the oxygen storage/release rate of the obtained oxygen storage material tends to decrease, while if the content of Ce is more than the upper limit, the heat resistance of the structure tends to decrease. Such a pyrochlore-type CZ may be obtained by: for example, generating a co-precipitate under the presence of ammonia using an aqueous solution containing a salt of cerium (for example, nitrate) and a salt of zirconium (for example, nitrate); calcining the obtained co-precipitate to prepare a ceria-zirconia solid solution; press-molding this ceria-zirconia solid solution under a condition of 40 to 350 MPa; and heating the obtained press-molded body at 1450 to 2000° C. under a reduction atmosphere.

In addition, the lanthana-zirconia composite oxide used as a raw material in the method for producing an oxygen storage material of the present invention is not particularly limited, and a conventionally known one may be used. In such a lanthana-zirconia composite oxide, the content of La is not particularly limited, but is preferably 0.40 to 0.60, and more preferably 0.45 to 0.55, in an atomic ratio [La/(La+Zr)] relative to the total amount of La and Zr. If the content of La is less than the lower limit, the heat resistance of the obtained oxygen storage material tends to decrease, while if the content of La is more than the upper limit, the pyrochlore structure tends to be unlikely to be formed. Example of such a lanthana-zirconia composite oxide includes a lanthana-zirconia solid solution which may be obtained by: for example, generating a co-precipitate under the presence of ammonia using an aqueous solution containing a salt of lanthanum (for example, nitrate) and a salt of zirconium (for example, nitrate); and calcining the obtained co-precipitate. In addition, in the method for producing an oxygen storage material of the present invention, a pyrochlore-type LZ obtained by: press-molding this lanthana-zirconia solid solution under a condition of 40 to 350 MPa; and heating the obtained press-molded body at 1450 to 2000° C. under a reduction atmosphere may be used as the lanthana-zirconia composite oxide. However, to simplify the synthesis steps, one having no pyrochlore structure (for example, the above-described lanthana-zirconia solid solution) is preferable as the lanthana-zirconia composite oxide.

Next, a reduction treatment is performed at a temperature of 1200 to 1600° C. on a raw material mixture containing the pyrochlore-type CZ and the lanthana-zirconia composite oxide in the above-described mass ratio. If the reduction temperature is less than the lower limit, the pyrochlore-type CZL is not sufficiently formed, so that the oxygen storage/release rate of the obtained oxygen storage material after exposed to high temperature tends to decrease. On the other hand, if the reduction temperature is more than the upper limit, the pyrochlore-type CZ and the pyrochlore-type LZ react with each other, so that only a pyrochlore CZL exists and the oxygen storage/release rate after exposed to high temperature tends to decrease. In addition, from the viewpoint that an oxygen storage material having a higher oxygen storage/release rate after exposed to high temperature can be obtained, the reduction temperature is preferably 1300 to 1600° C., and more preferably 1400 to 1600° C. The reduction time is preferably 1 to 25 hours, and more preferably 2 to 5 hours. If the reduction time is less than the lower limit, the pyrochlore-type CZL is not sufficiently formed, so that the oxygen storage/release rate of the obtained oxygen storage material after exposed to high temperature tends to decrease, while if the reduction time is more than the upper limit, the formation of the pyrochlore-type CZL tends to be saturated.

The method for the reduction treatment is not particularly limited, as long as the method is capable of heating the raw material mixture at a predetermined temperature under a reduction atmosphere, and examples thereof include (i) a method including: placing the raw material mixture in a vacuum heating furnace; after vacuuming, allowing a reducing gas to flow into the furnace to make the atmosphere in the furnace a reduction atmosphere; and heating at the predetermined temperature to perform the reduction treatment, (ii) a method including: using a furnace made of graphite and placing the raw material mixture in the furnace; and after vacuuming, heating at the predetermined temperature and making the atmosphere in the furnace a reduction atmosphere with reducing gases such as CO and HC generated from the furnace body, the heating fuel, and the like to perform the reduction treatment, (iii) a method including: placing the raw material mixture in a crucible filled with activated carbon; and heating at the predetermined temperature and making the atmosphere in the crucible a reduction atmosphere with reducing gases such as CO and HC generated from the activated carbon and the like to perform the reduction treatment. Among these reduction treatment methods, the (iii) method is preferable from the viewpoint it is simple and does not require a special reaction furnace.

In addition, the reducing gas used for achieving such a reduction atmosphere is not particularly limited, and examples thereof include CO, HC, $H_2$, other hydrocarbon gases, and the like. Among such reducing gases, CO and $H_2$ are preferable from the viewpoint that post-treatment is easy.

In the method for producing an oxygen storage material of the present invention, an oxidation treatment is preferably performed on the reduction product obtained as described above. This compensates for oxygen lost from the oxygen storage material during the reduction treatment and thus improves the stability as an oxygen storage material. The method for such an oxidation treatment is not particularly limited, and example thereof includes a method including heating the reduction product under an oxidation atmosphere (for example, in the atmosphere). In addition, the heating temperature in such an oxidation treatment is not particularly limited, but is preferably 300 to 800° C. In addition, the heating time is also not particularly limited, but is preferably 0.5 to 5 hours.

The oxygen storage material obtained as described above comprises: a pyrochlore-type CZ, a pyrochlore-type LZ, and a pyrochlore-type CZL coexisting together, and preferably contains: first secondary particles made of the pyrochlore-type CZ and the pyrochlore-type CZL; and second secondary particles made of the pyrochlore-type LZ and the pyrochlore-type CZL. Such an oxygen storage material has a high oxygen storage/release rate even after exposed to high temperature.

EXAMPLES

Hereinafter, the present invention will be described in more details based on Examples and Comparative Examples. The present invention however is not limited to the following Examples. Note that various oxide powders used in Examples and Comparative Examples were prepared by the following methods.

Preparation Example 1

First, 347.4 g (0.8 mol) of cerium nitrate hexahydrate, 221 g (0.8 mol) of zirconium oxynitrate dihydrate, and 199.5 g of 18% hydrogen peroxide water were dissolved in 900 ml of deionized water. A hydroxide precipitation was then obtained by a reverse co-precipitation method using this solution and 326.4 g of 25% ammonia aqueous solution. This precipitate was dispensed into a beaker and heated at 150° C. for 7 hours to remove the water content, followed by pre-calcination at 400° C. for 5 hours in the atmosphere to obtain a ceria-zirconia solid solution (Ce/Zr=1/1 (in an atomic ratio); hereinafter, referred to as a "CZ solid solution"). This CZ solid solution was press-molded at 3000 kgf/cm² (294.2 MPa) to obtain a molded body with 5 cm×5 cm×0.5 cm. This molded body was placed in a crucible filled with activated carbon and was reduction-calcined at 1675° C. for 5 hours in the atmosphere. A reduction-calcined product thus obtained was cooled down to room temperature, and was then taken out of the crucible, followed by further calcination at 500° C. for 5 hours in the atmosphere. Thereafter, the resultant product was pulverized to have a particle diameter of 75 μm or less using a pulverizer ("Wonder-Blender" available from AS ONE Corporation) to thus obtain a CZ powder having a pyrochlore structure (a pyrochlore-type CZ powder).

Preparation Example 2

A CZ solid solution (Ce/Zr=1/1 (in an atomic ratio)) was obtained in the same manner as in Preparation Example 1. This CZ solid solution was calcined at 500° C. for 5 hours in the atmosphere, and was then pulverized to have a particle diameter of 75 μm or less using the pulverizer ("Wonder- Blender" available from AS ONE Corporation) to thus obtain a CZ powder having no pyrochlore structure.

Preparation Example 3

First, 346.4 g (0.8 mol) of lanthanum nitrate and 221 g (0.8 mol) of zirconium oxynitrate dihydrate were dissolved in 900 ml of deionized water. A hydroxide precipitation was then obtained by the reverse co-precipitation method using this solution and 326.4 g of 25% ammonia aqueous solution. This precipitate was dispensed into a beaker and heated at 150° C. for 7 hours to remove the water content, followed by pre-calcination at 400° C. for 5 hours in the atmosphere to obtain a lanthana-zirconia solid solution (La/Zr=1/1 (in an atomic ratio); hereinafter, referred to as a "LZ solid solution"). This LZ solid solution was pulverized to have a particle diameter of 75 μm or less using the pulverizer ("Wonder-Blender" available from AS ONE Corporation) to obtain a LZ powder having no pyrochlore structure.

Preparation Example 4

A LZ solid solution (La/Zr=1/1 (in an atomic ratio)) was obtained in the same manner as in Preparation Example 3. This LZ solid solution was placed in a crucible filled with activated carbon, and was reduction-calcined at 1400° C. for 25 hours in the atmosphere. A reduction-calcined product thus obtained was then pulverized to have a particle diameter of 75 μm or less using the pulverizer ("Wonder-Blender" available from AS ONE Corporation) to obtain a LZ powder having a pyrochlore structure (pyrochlore-type LZ powder).

Preparation Example 5

First, 347.4 g (0.8 mol) of cerium nitrate hexahydrate, 442 g (1.6 mol) of zirconium oxynitrate dihydrate, 346.4 g (0.8 mol) of lanthanum nitrate, and 199.5 g of 18% hydrogen peroxide water were dissolved in 1800 ml of deionized water. A hydroxide precipitation was obtained by a reverse co-precipitation method using this solution and 652.8 g of 25% ammonia aqueous solution. This precipitate was dispensed into a beaker and heated at 150° C. for 7 hours to remove the water content, followed by pre-calcination at 400° C. for 5 hours in the atmosphere to obtain a ceria-zirconia-lanthana solid solution (Ce/Zr/La=1/2/1 (in an atomic ratio); hereinafter, referred to as a "CZL solid solution"). This CZL solid solution was press-molded at 3000 kgf/cm$^2$ (294.2 MPa) to obtain a molded body with 5 cm×5 cm×0.5 cm. This molded body was placed in a crucible filled with activated carbon, and was reduction-calcined at 1675° C. for 5 hours in the atmosphere. A reduction-calcined product thus obtained was cooled down to room temperature, and was then taken out of the crucible, followed by further calcination at 500° C. for 5 hours in the atmosphere. Thereafter, the resultant product was pulverized to have a particle diameter of 75 μm or less using the pulverizer ("Wonder-Blender" available from AS ONE Corporation) to thus obtain a CZL powder having a pyrochlore structure (a pyrochlore-type CZL powder).

Example 1

The pyrochlore-type CZ powder obtained in Preparation Example 1 and the LZ powder having no pyrochlore structure obtained in Preparation Example 3 were uniformly mixed in a mass ratio of CZ/LZ=1/1 by repeatedly performing a mixing operation three times using a sieve having a mesh diameter of 75 μm. A raw material mixture thus obtained was press-molded at 3000 kgf/cm$^2$ (294.2 MPa) to obtain a molded body with 5 cm×5 cm×0.5 cm. This press-molded body was placed in a crucible filled with activated carbon, and was reduction-calcined at 1600° C. for 5 hours in the atmosphere. A reduction-calcined product thus obtained was cooled down to room temperature, and was taken out of the crucible, followed by calcination at 500° C. for 5 hours in the atmosphere. Thereafter, the resultant product was pulverized to have a particle diameter of 75 μm or less using the pulverizer ("Wonder-Blender" available from AS ONE Corporation) to thus obtain a composite oxide powder.

Example 2

A composite oxide powder was obtained in the same manner as in Example 1 except that the mass ratio between the pyrochlore-type CZ powder and the LZ powder having no pyrochlore structure was changed to CZ/LZ=2/1.

Example 3

A composite oxide powder was obtained in the same manner as in Example 1 except that the mass ratio between the pyrochlore-type CZ powder and the LZ powder having no pyrochlore structure was changed to CZ/LZ=4/1.

Example 4

A composite oxide powder was obtained in the same manner as in Example 1 except that the mass ratio between the pyrochlore-type CZ powder and the LZ powder having no pyrochlore structure was changed to CZ/LZ=8/1.

Example 5

A composite oxide powder was obtained in the same manner as in Example 1 except that the mass ratio between the pyrochlore-type CZ powder and the LZ powder having no pyrochlore structure was changed to CZ/LZ=1/2.

Example 6

A composite oxide powder was obtained in the same manner as in Example 1 except that the mass ratio between the pyrochlore-type CZ powder and the LZ powder having no pyrochlore structure was changed to CZ/LZ=1/4.

Example 7

A composite oxide powder was obtained in the same manner as in Example 1 except that the mass ratio between the pyrochlore-type CZ powder and the LZ powder having no pyrochlore structure was changed to CZ/LZ=1/8.

Comparative Example 1

A composite oxide powder was obtained in the same manner as in Example 1 except that the mass ratio between the pyrochlore-type CZ powder and the LZ powder having no pyrochlore structure was changed to CZ/LZ=9/1.

Comparative Example 2

A composite oxide powder was obtained in the same manner as in Example 1 except that the mass ratio between the pyrochlore-type CZ powder and the LZ powder having no pyrochlore structure was changed to CZ/LZ=1/9.

Comparative Example 3

A press-molded body prepared in the same manner as in Example 1 was placed in a crucible filled with activated carbon, and was reduction-calcined at 1675° C. for 5 hours in the atmosphere. A reduction-calcined product thus obtained was cooled down to room temperature, and was then taken out of the crucible, followed by additional calcination at 500° C. for 5 hours in the atmosphere. Thereafter, the resultant product was pulverized to have a particle diameter of 75 μm or less using the pulverizer ("Wonder-Blender" available from AS ONE Corporation) to thus obtain a composite oxide powder.

Comparative Example 4

A composite oxide powder was obtained in the same manner as in Example 1 except that the CZ powder having no pyrochlore structure obtained in Preparation Example 2 was used instead of the pyrochlore-type CZ powder obtained in Preparation Example 1, and that the pyrochlore-type LZ powder obtained in Preparation Example 4 was used instead of the LZ powder having no pyrochlore structure obtained in Preparation Example 3.

Comparative Example 5

A mixed powder of a pyrochlore-type CZ powder and a pyrochlore-type LZ powder was obtained by uniformly mixing the pyrochlore-type CZ powder obtained in Preparation Example 1 and the pyrochlore-type LZ powder obtained in Preparation Example 4 in a mass ratio of 1:1 by repeatedly performing a mixing operation three times using a sieve having a mesh diameter of 75 μm.

Comparative Example 6

A mixed powder of a pyrochlore-type CZ powder and a pyrochlore-type CZL powder was obtained in the same manner as in Comparative Example 5 except that the pyrochlore-type CZL powder obtained in Preparation Example 5 was used instead of the pyrochlore-type LZ powder.

Comparative Example 7

A mixed powder of a pyrochlore-type CZL powder and a pyrochlore-type LZ powder was obtained in the same manner as in Comparative Example 5 except that the pyrochlore-type CZL powder obtained in Preparation Example 5 was used instead of the pyrochlore-type CZ powder.

<Durability Test>

The composite oxide powders obtained in Examples 1 to 7 and Comparative Examples 1 to 4 as well as the mixed powders obtained in Comparative Examples 5 to 7 were heated at 1100° C. for 5 hours in the atmosphere.

<X-Ray Diffraction Measurement>

X-ray diffraction patterns of the composite oxide powders and the mixed powders after the durability test were measured using an X-ray diffraction system ("RINT-Ultima" available from Rigaku Corporation) with CuKα as an X-ray source. As examples, the X-ray diffraction patterns of the composite oxide powders (after the durability test) obtained in Examples 1 to 2 and Comparative Examples 3 to 4 are shown in FIG. 1A to FIG. 1B.

As is clear from the results shown in FIG. 1A, when the press-molded body made of the CZ powder having the pyrochlore structure and the LZ powder having no pyrochlore structure was reduction-calcined at 1600° C. (Examples 1 to 2), in addition to a diffraction peak derived from the pyrochlore structure of the ceria-zirconia composite oxide (a CZ pyrochlore structure ($Ce_2Zr_2O_8$)) and a diffraction peak derived from the pyrochlore structure of the lanthana-zirconia composite oxide (a LZ pyrochlore structure ($La_2Zr_2O_7$)), a diffraction peak derived from the pyrochlore structure of the ceria-zirconia-lanthana composite oxide having an intermediate composition therebetween (a CZL pyrochlore structure) was observed.

In addition, also in the cases of the composite oxide powders (after the durability test) obtained in Examples 3 to 7, three diffraction peaks derived from the CZ pyrochlore structure, the LZ pyrochlore structure, and the CZL pyrochlore structure were observed.

Figure 1B:
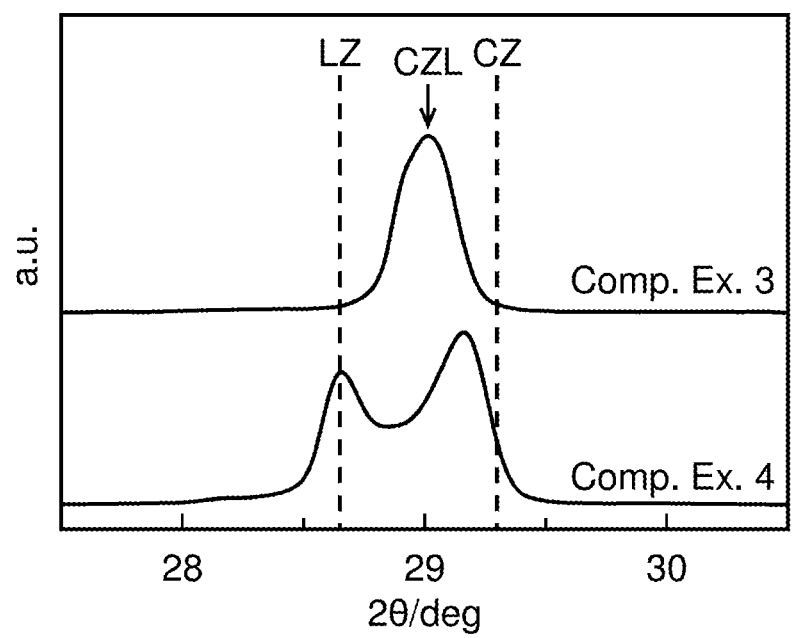
FIG. 1B is a graph showing X-ray diffraction patterns of composite oxide powders obtained in Comparative Examples 3 to 4.

On the other hand, as is clear from the results shown in FIG. 1B, when the press-molded body made of the CZ powder having the pyrochlore structure and the LZ powder having no pyrochlore structure was reduction-calcined at 1675° C. (Comparative Example 3), diffraction peaks derived from the CZ pyrochlore structure and the LZ pyrochlore structure were not observed, and only a diffraction peak derived from the CZL pyrochlore structure was observed. In addition, when the press-molded body made of the CZ powder having no pyrochlore structure and the LZ powder having the pyrochlore structure was reduction-calcined at 1600° C. (Comparative Example 4), although a diffraction peak derived from the CZ pyrochlore structure and a diffraction peak derived from the LZ pyrochlore structure were observed, a diffraction peak derived from the CZL pyrochlore structure was not observed.

Moreover, also in the cases of the composite oxide powder obtained by reduction-calcining at 1600° C. the press-molded body containing the CZ powder having the pyrochlore structure and the LZ powder having no pyrochlore structure in a mass ratio of 1:9 or 9:1 (Comparative Examples 1 to 2), and the mixed powder of the CZ powder having the pyrochlore structure and the LZ powder having the pyrochlore structure (Comparative Example 5), although two diffraction peaks derived from the CZ pyrochlore structure and the LZ pyrochlore structure were observed, a diffraction peak derived from the CZL pyrochlore structure was not observed.

In addition, in the case of the mixed powder of the CZ powder having the pyrochlore structure and the CZL powder having the pyrochlore structure (Comparative Example 6), although two diffraction peaks derived from the CZ pyrochlore structure and the CZL pyrochlore structure were observed, a diffraction peak derived from the LZ pyrochlore structure was not observed. Moreover, in the case of the mixed powder of the CZL powder having the pyrochlore structure and the LZ powder having the pyrochlore structure (Comparative Example 7), although two diffraction peaks derived from the CZL pyrochlore structure and the LZ pyrochlore structure were observed, a diffraction peak derived from the CZ pyrochlore structure was not observed.

From the above-described results, it was acknowledged that in the composite oxide powders (after the durability test) obtained in Examples 1 to 7, the pyrochlore-type ceria-zirconia composite oxide (the pyrochlore-type CZ), the pyrochlore-type lanthana-zirconia composite oxide (the pyrochlore-type LZ), and the pyrochlore-type ceria-zirconia-lanthana composite oxide (the pyrochlore-type CZL) coexisted together. On the other hand, it was found that in the composite oxide powders (after the durability test) obtained in Comparative Examples 1 to 2 and 4 as well as the mixed powder (after the durability test) obtained in Comparative Example 5, although the pyrochlore-type CZ and the pyrochlore-type LZ coexisted together, the pyrochlore-type CZL did not exist. In addition, it was found that in the composite oxide powder (after the durability test) obtained in Comparative Example 3, only the pyrochlore-type CZL existed, but the pyrochlore-type CZ or pyrochlore-type LZ did not exist. Moreover, it was found that in the mixed powder (after the durability test) obtained in Comparative Example 6, although the pyrochlore-type CZ and the pyrochlore-type CZL coexisted together, the pyrochlore-type LZ did not exist. Furthermore, it was found that in the mixed powder (after the durability test) obtained in Comparative Example 7, although the pyrochlore-type CZL and the pyrochlore-type LZ coexisted together, the pyrochlore-type CZ did not exist.

<Energy Dispersive X-Ray (EDX) Spectrometry>

Figure 2A:
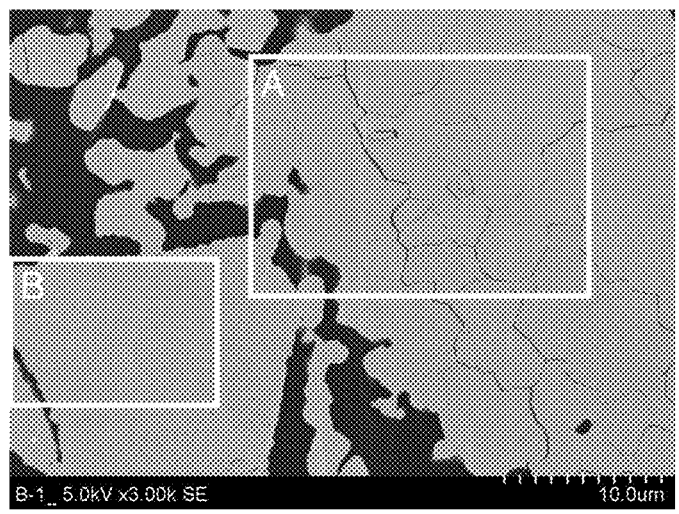
FIG. 2A is a scanning electron microscope image of the composite oxide powder obtained in Example 1.
Figure 2B:
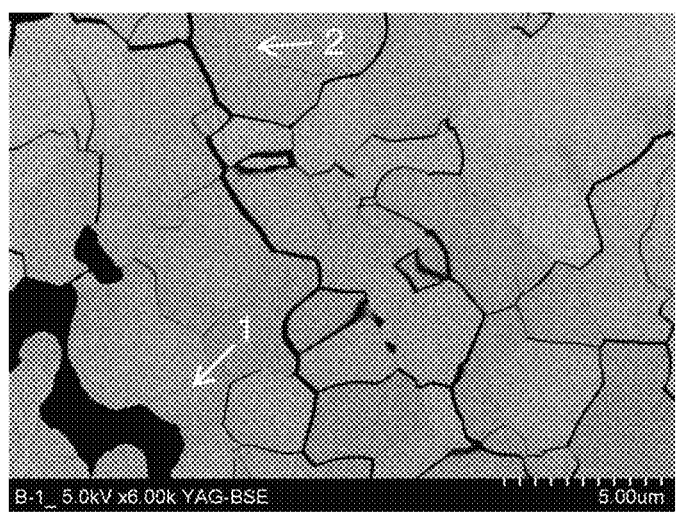
FIG. 2B is a scanning electron microscope image showing a region A in FIG. 2A in an enlarged manner.
Figure 2C:
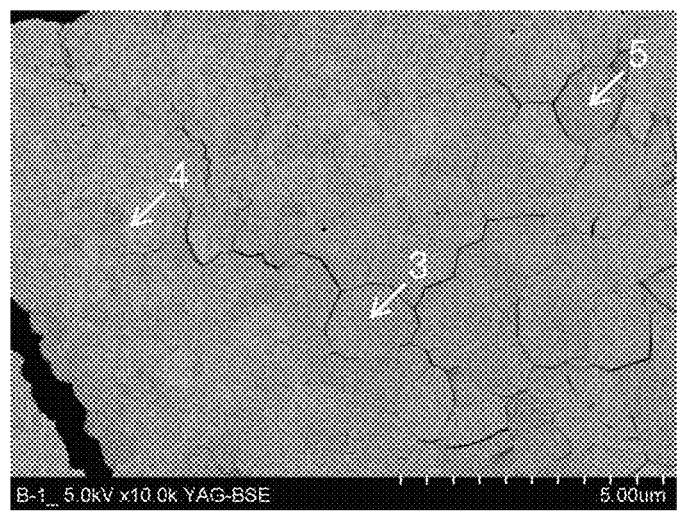
FIG. 2C is a scanning electron microscope image showing a region B in FIG. 2A in an enlarged manner.
Figure 3A:
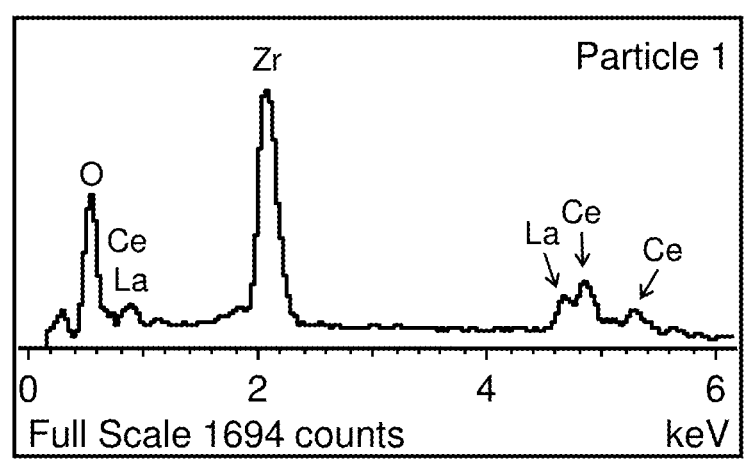
FIG. 3A is a graph showing an EDX spectrum of a particle 1 in FIG. 2B.
Figure 3B:
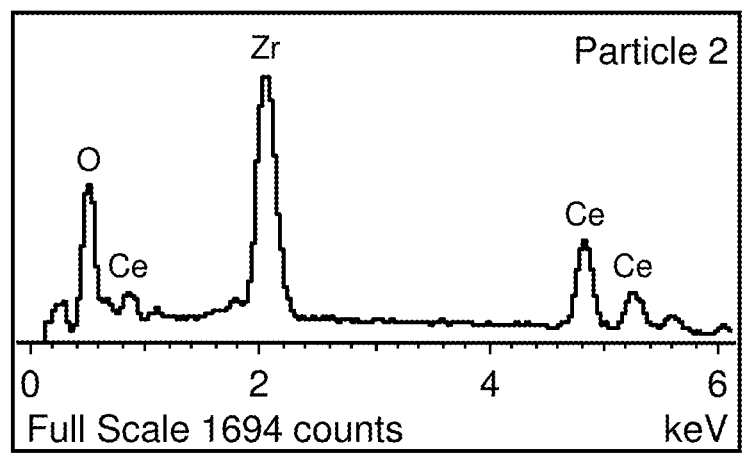
FIG. 3B is a graph showing an EDX spectrum of a particle 2 in FIG. 2B.
Figure 3C:
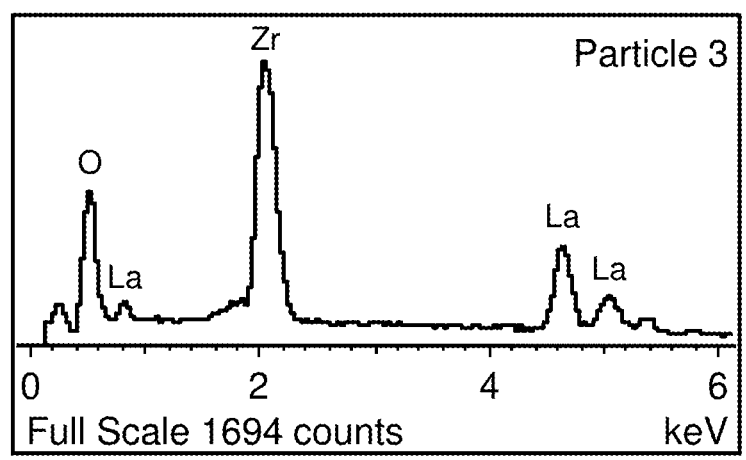
FIG. 3C is a graph showing an EDX spectrum of a particle 3 in FIG. 2C.
Figure 3D:
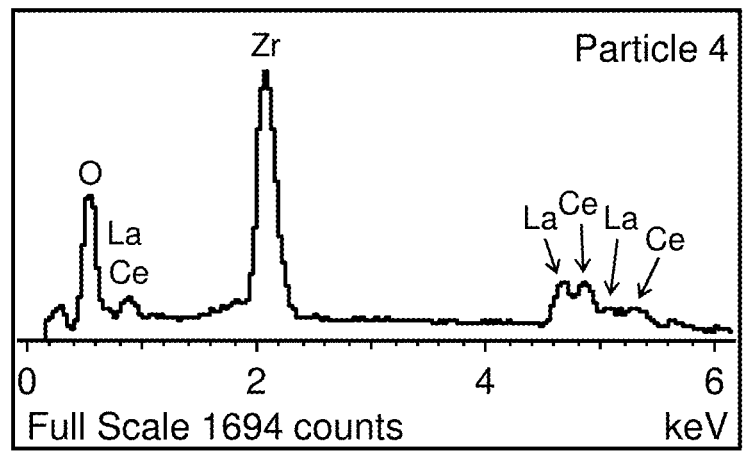
FIG. 3D is a graph showing an EDX spectrum of a particle 4 in FIG. 2C.
Figure 3E:
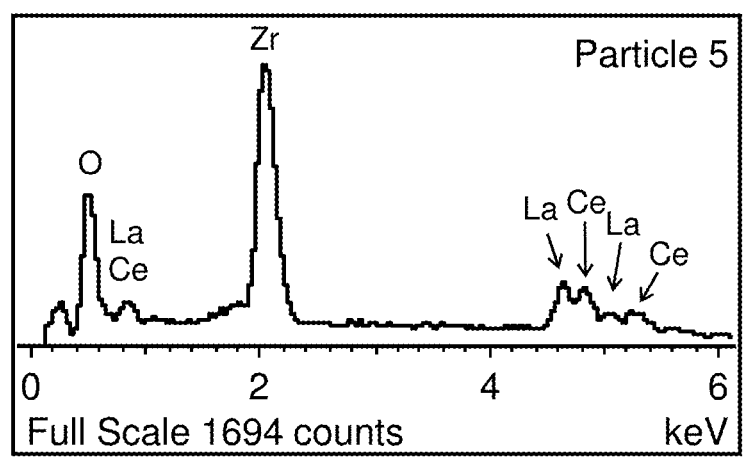
FIG. 3E is a graph showing an EDX spectrum of a particle 5 in FIG. 2C.

An energy dispersive X-ray (EDX) spectrometry was conducted on the composite oxide powder after the durability test, using a scanning electron microscope (SEM). As an example, a SEM image of the composite oxide powder (after the durability test) obtained in Example 1 is shown in FIG. 2A. In addition, enlarged images of regions A and B in FIG. 2A are shown in FIG. 2B and FIG. 2C. Moreover, the energy dispersive X-ray (EDX) spectrometry was conducted on particles 1 to 5 in FIG. 2B and FIG. 2C. EDX spectra of particles 1 to 5 are shown in FIG. 3A to FIG. 3E, respectively.

As is clear from the results shown in FIG. 3A to FIG. 3E, it was found that the particles 1, 4 to 5 were the ceria-zirconia-lanthana composite oxide (CZL), the particle 2 was the ceria-zirconia composite oxide (CZ), and the particle 3 was the lanthana-zirconia composite oxide (LZ).

From the above-described results, it was acknowledged that the secondary particle shown by the region A in FIG. 2A was made of CZ and CZL and the secondary particle shown by the region B was made of CZL and LZ.

<Content of Cerium in Pyrochlore-Type Ceria-Zirconia-Lanthana Composite Oxide>

Figure 4A:
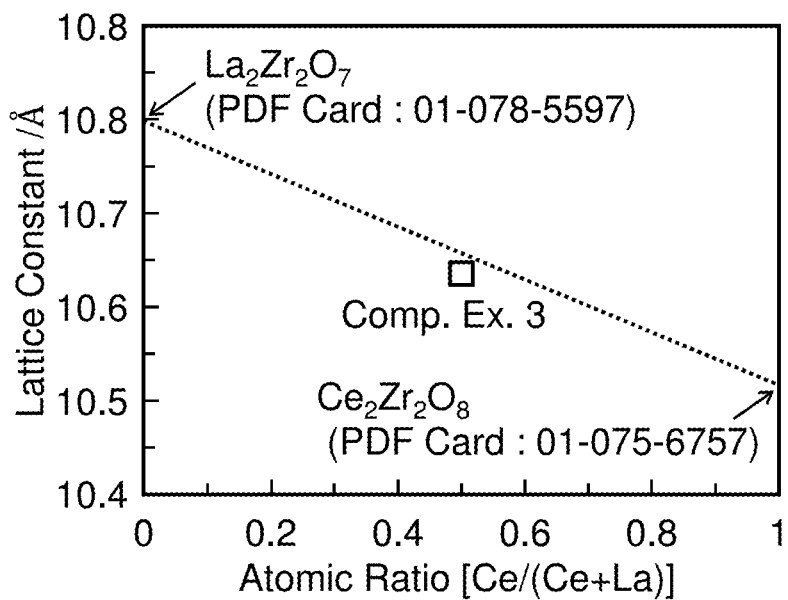
FIG. 4A is a graph showing a relation between the content of cerium and the lattice constant of the composite oxide powder obtained in Comparative Example 3.

First, a lattice constant of the pyrochlore-type CZL powder (after the durability test) obtained in Comparative Example 3 was determined based on the X-ray diffraction peak derived from the CZL pyrochlore structure shown in FIG. 1B. This was plotted with respect to the atomic ratio [Ce/(Ce+La)] of the content of cerium relative to the total amount of cerium and lanthanum in the pyrochlore-type CZL. This result is shown in FIG. 4A. Note that the atomic ratio [Ce/(Ce+La)] was calculated from a loading ratio between the pyrochlore-type CZ powder and the LZ powder having no pyrochlore structure.

As is clear from the result shown in FIG. 4A, it was found that the atomic ratio [Ce/(Ce+La)] and the lattice constant of the pyrochlore-type CZL followed Vergard's law having $La_2Zr_2O_7$ (PDF card: 01-078-5597) and $Ce_2Zr_2O_8$ (PDF card: 01-075-6757) at the opposite ends.

In this respect, lattice constants of the pyrochlore-type CZL in the composite oxide powders (after the durability test) obtained in Examples 1 to 2 were determined based on the X-ray diffraction peak derived from the CZL pyrochlore structure shown in FIG. 1A, and were plotted with respect to the atomic ratios [Ce/(Ce+La)] of the pyrochlore-type CZL in the composite oxide powders (after the durability test) obtained in Examples 1 to 2 on the premise that the atomic ratio [Ce/(Ce+La)] and the lattice constant of the pyrochlore-type CZL follow Vergard's law having $La_2Zr_2O_7$ (PDF card: 01-078-5597) and $Ce_2Zr_2O_8$ (PDF card: 01-075-6757) at the opposite ends. The results are shown in FIG. 4B.

Figure 4B:
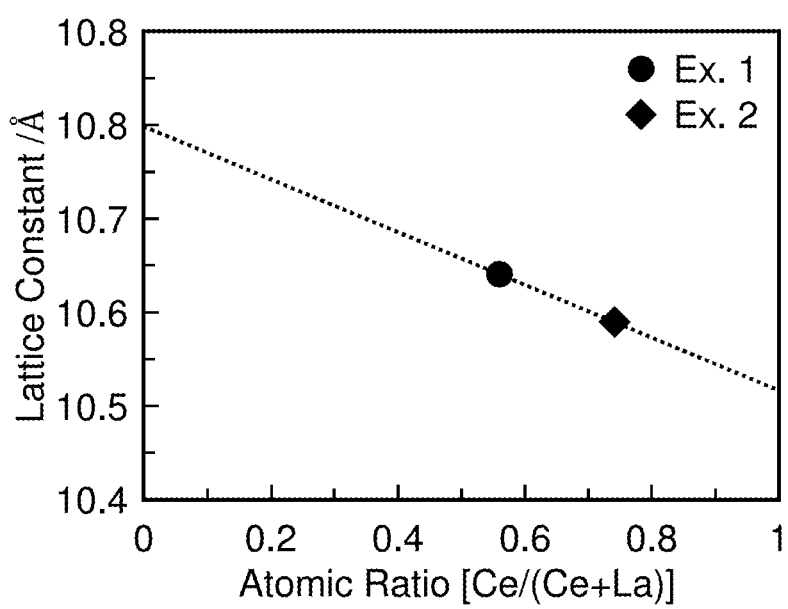
FIG. 4B is a graph showing a relation between the content of cerium and the lattice constant of a pyrochlore-type ceria-zirconia-lanthana composite oxide in the composite oxide powder obtained in each of Examples 1 to 2.

As shown in FIG. 4B, it was found that the atomic ratio [Ce/(Ce+La)] in the pyrochlore-type CZL substantially corresponded to the loading ratio between the pyrochlore-type CZ powder and the pyrochlore-type LZ powder.

<Oxygen Storage Capacity (OSC) Measurement>

A palladium-supported alumina powder (the amount of Pd supported: 25% by mass) and the composite oxide powder or the mixed powder after the durability test were mixed in a mass ratio of 1:1, and a mixture thus obtained was press-molded at 1000 kgf/cm$^2$ (98.07 MPa). This press-molded body was pulverized using a mortar to obtain a pellet catalyst having a particle diameter of 0.5 to 1 mm.

Then, 0.5 g of this pellet catalyst was placed in a fixed-bed catalytic reactor ("CATA5000-SP7" available from Best Instruments Co., Ltd.). A CO-containing gas [CO (2%)/N$_2$ (balance)] and an oxygen-containing gas [O$_2$ (1%)/N$_2$ (balance)] were caused to alternately flow through this pellet catalyst while being switched every 5 minutes under conditions of a catalyst-entering gas temperature of 600° C. and a flow rate of 10 L/min, and an oxygen storage/release rate (OSC-r, unit: pmol/(g·s)) was determined from an average value of the amount of CO$_2$ generated 5 seconds after the gas was switched to the CO-containing gas. The results are shown in Table 1.

TABLE 1

| | Raw Material Powder | | Reduction Temperature [° C.] | Pyrochlore-type Composite Oxides | OSC-r @ 600° C. [μmol/(g·s)] |
|---|---|---|---|---|---|
| | Kind | Mass Ratio | | | |
| Ex. 1 | pCZ/LZ | 1/1 | 1600 | pCZ-pCZL-pLZ | 16.62 |
| Ex. 2 | pCZ/LZ | 2/1 | 1600 | pCZ-pCZL-pLZ | 16.04 |
| Ex. 3 | pCZ/LZ | 4/1 | 1600 | pCZ-pCZL-pLZ | 11.46 |
| Ex. 4 | pCZ/LZ | 8/1 | 1600 | pCZ-pCZL-pLZ | 10.62 |
| Ex. 5 | pCZ/LZ | 1/2 | 1600 | pCZ-pCZL-pLZ | 13.86 |
| Ex. 6 | pCZ/LZ | 1/4 | 1600 | pCZ-pCZL-pLZ | 12.82 |
| Ex. 7 | pCZ/LZ | 1/8 | 1600 | pCZ-pCZL-pLZ | 15.24 |
| Comp. Ex. 1 | pCZ/LZ | 9/1 | 1600 | pCZ-pLZ | 10.00 |
| Comp. Ex. 2 | pCZ/LZ | 1/9 | 1600 | pCZ-pLZ | 8.82 |
| Comp. Ex. 3 | pCZ/LZ | 1/1 | 1675 | pCZL | 9.58 |
| Comp. Ex. 4 | CZ/pLZ | 1/1 | 1600 | pCZ-pLZ | 9.18 |
| Comp. Ex. 5 | pCZ/pLZ | 1/1 | Only Mixed | pCZ-pLZ | 4.26 |
| Comp. Ex. 6 | pCZ/pCZL | 1/1 | Only Mixed | pCZ-pCZL | 8.01 |
| Comp. Ex. 7 | pCZL/pLZ | 1/1 | Only Mixed | pCZL-pLZ | 4.15 | pCZ: Pyrochlore-type CZ, pLZ: Pyrochlore-type LZ, pCZL: Pyrochlore-type CZL
CZ: CZ Having No Pyrochlore Structure, LZ: LZ Having No Pyrochlore Structure As is clear from the results shown in Table 1, it was found that the pellet catalysts prepared using the composite oxide powders (after the durability test) obtained in Examples were excellent in oxygen storage/release rate (OSC-r) compared with the pellet catalysts prepared using the composite oxide powders (after the durability test) or the mixed powders (after the durability test) obtained in Comparative Examples. It is speculated that since the pyrochlore-type CZ, the pyrochlore-type LZ, and the pyrochlore-type CZL coexist together, the oxygen storage capacity (OSC) of the pyrochlore-type CZ is improved by the pyrochlore-type CZL.

As described above, according to the present invention, it is possible to obtain an oxygen storage material having a high oxygen storage/release rate even after exposed to high temperature.

Therefore, since the oxygen storage material of the present invention is capable of exhibiting a sufficiently high oxygen storage/release rate even after exposed to high temperature, the oxygen storage material of the present invention is useful as a support, a promoter, a catalyst atmosphere adjuster and the like for catalysts for purification of exhaust gas.

What is claimed is:

1. An oxygen storage material comprising three pyrochlore-type composite oxides which are a ceria-zirconia composite oxide, a lanthana-zirconia composite oxide, and a ceria-zirconia-lanthana composite oxide, and which coexist together, wherein the oxygen storage material contains:
    first secondary particles made of the pyrochlore-type ceria-zirconia composite oxide and the pyrochlore-type ceria-zirconia-lanthana composite oxide; and
    second secondary particles made of the pyrochlore-type lanthana-zirconia composite oxide and the pyrochlore-type ceria-zirconia-lanthana composite oxide.

2. The oxygen storage material according to claim 1, wherein
    in the entire oxygen storage material, a content of cerium relative to a total amount of cerium and lanthanum in the pyrochlore-type ceria-zirconia-lanthana composite oxide is 0.30 to 0.90 in an atomic ratio [Ce/(Ce+La)].

3. The oxygen storage material according to claim 2, wherein
    in the entire oxygen storage material, a content of cerium relative to a total amount of cerium and lanthanum in the pyrochlore-type ceria-zirconia-lanthana composite oxide is 0.50 to 0.90 in an atomic ratio [Ce/(Ce+La)].

4. The oxygen storage material according to claim 1, wherein
    in the entire oxygen storage material, a content of cerium relative to a total amount of cerium and zirconium in the pyrochlore-type ceria-zirconia composite oxide is 0.40 to 0.70 in an atomic ratio [Ce/(Ce+Zr)].

5. The oxygen storage material according to claim 1, wherein
    in the entire oxygen storage material, a content of lanthanum relative to a total amount of lanthanum and zirconium in the pyrochlore-type lanthana-zirconia composite oxide is 0.40 to 0.60 in an atomic ratio [La/(La+Zr)].

6. The oxygen storage material according to claim 1, wherein
    a content ratio of the pyrochlore-type ceria-zirconia composite oxide is 30 to 80% by mass, a content ratio of the pyrochlore-type lanthana-zirconia composite oxide is 10 to 40% by mass, and a content ratio of the pyrochlore-type ceria-zirconia-lanthana composite oxide is 10 to 60% by mass, relative to a total amount of the pyrochlore-type ceria-zirconia composite oxide, the pyrochlore-type lanthana-zirconia composite oxide, and the pyrochlore-type ceria-zirconia-lanthana composite oxide.

7. A method for producing an oxygen storage material comprising:
    performing a reduction treatment at a temperature of 1200 to 1600° C. on a raw material mixture containing a pyrochlore-type ceria-zirconia composite oxide and a lanthana-zirconia composite oxide in a mass ratio of 1:8 to 8:1, thereby obtaining an oxygen storage material including three pyrochlore-type oxides which are a ceria-zirconia composite oxide, a lanthana-zirconia composite oxide, and a ceria-zirconia-lanthana composite oxide, and which coexist together.

8. The method for producing an oxygen storage material according to claim 7, wherein
    the lanthana-zirconia composite oxide in the raw material mixture has no pyrochlore structure.

9. The method for producing an oxygen storage material according to claim 7, wherein
    in the raw material mixture, a content of cerium relative to a total amount of cerium and zirconium in the pyrochlore-type ceria-zirconia composite oxide is 0.40 to 0.90 in an atomic ratio [Ce/(Ce+Zr)].

10. The method for producing an oxygen storage material according to claim 7, wherein
    in the raw material mixture, a content of lanthanum relative to a total amount of lanthanum and zirconium in the lanthana-zirconia composite oxide is 0.40 to 0.60 in an atomic ratio [La/(La+Zr)].

* * * * *